Nov. 19, 1957   G. M. TROTTIER   2,813,379
GRINDING MACHINE
Filed May 17, 1956   5 Sheets-Sheet 3
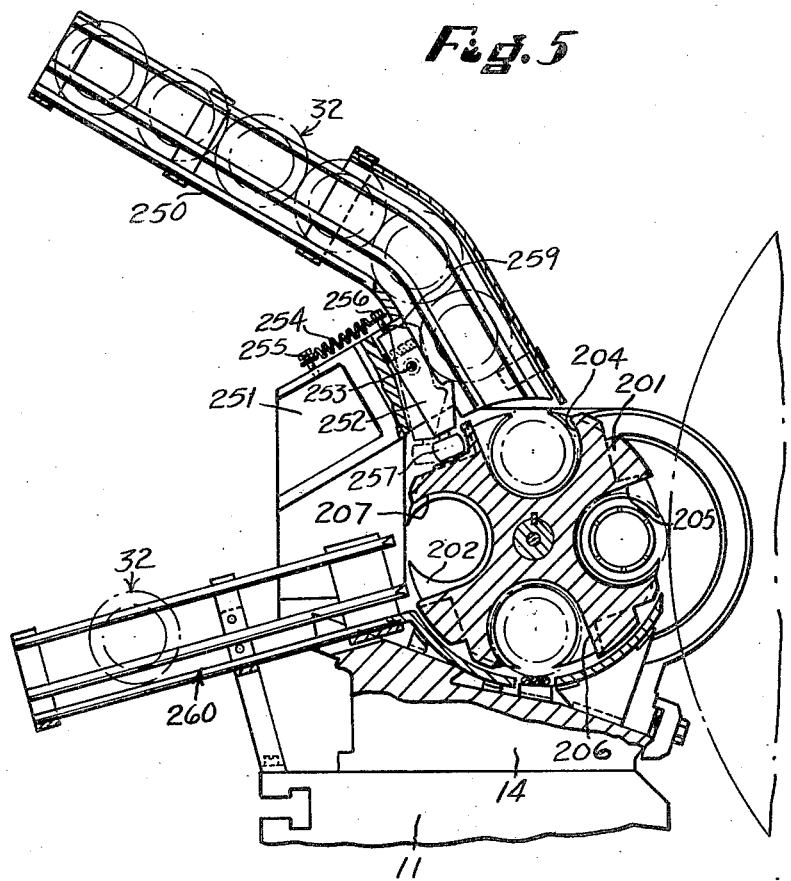
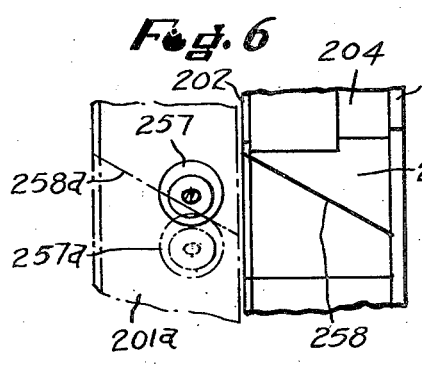
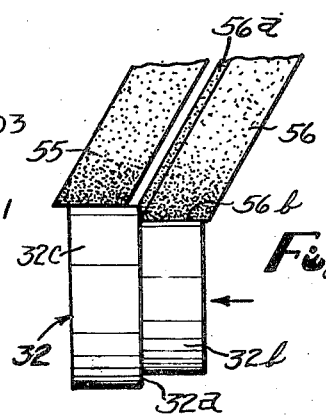
INVENTOR
GERARD M. TROTTIER
BY
Harold W. Eaton
ATTORNEY

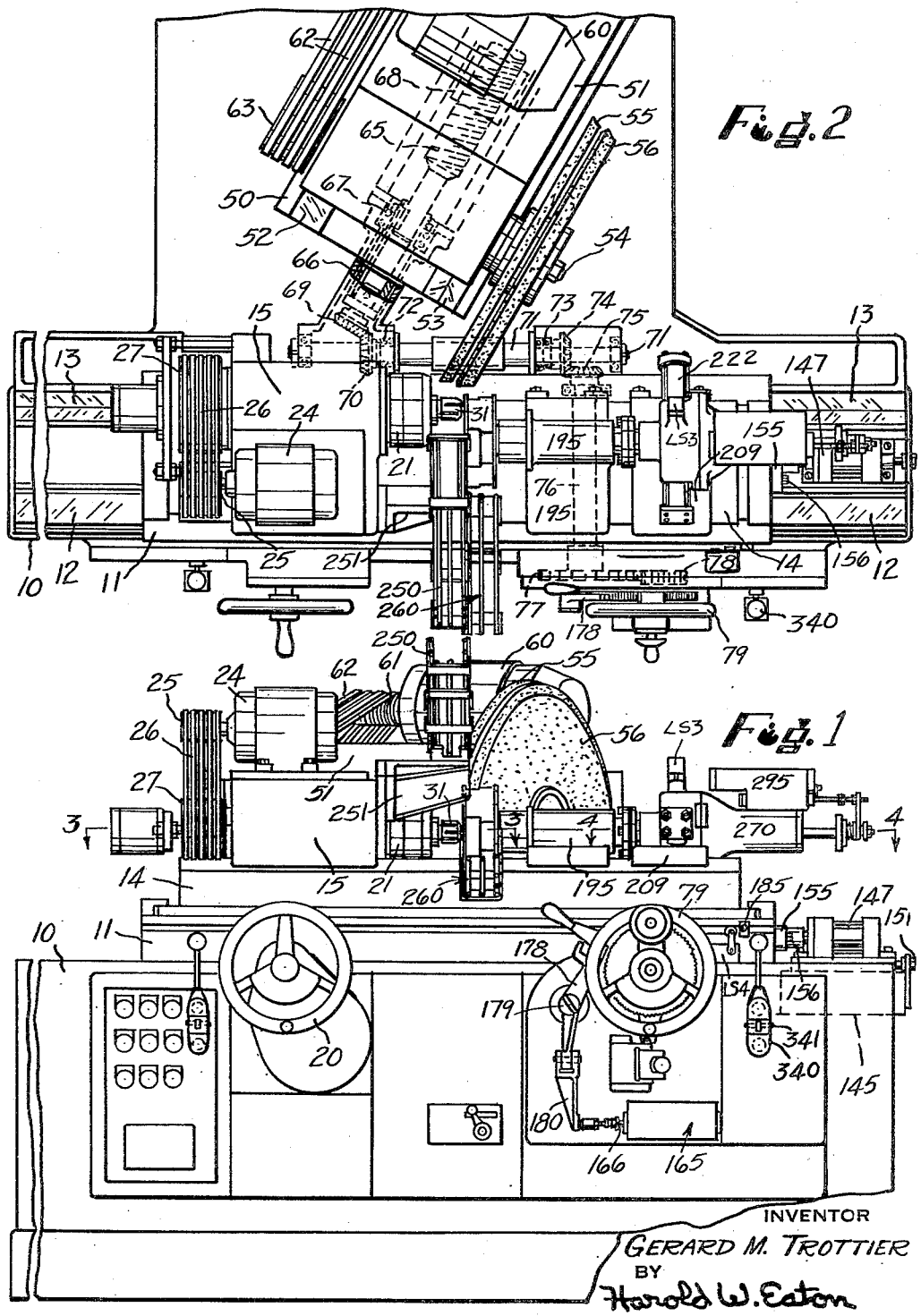

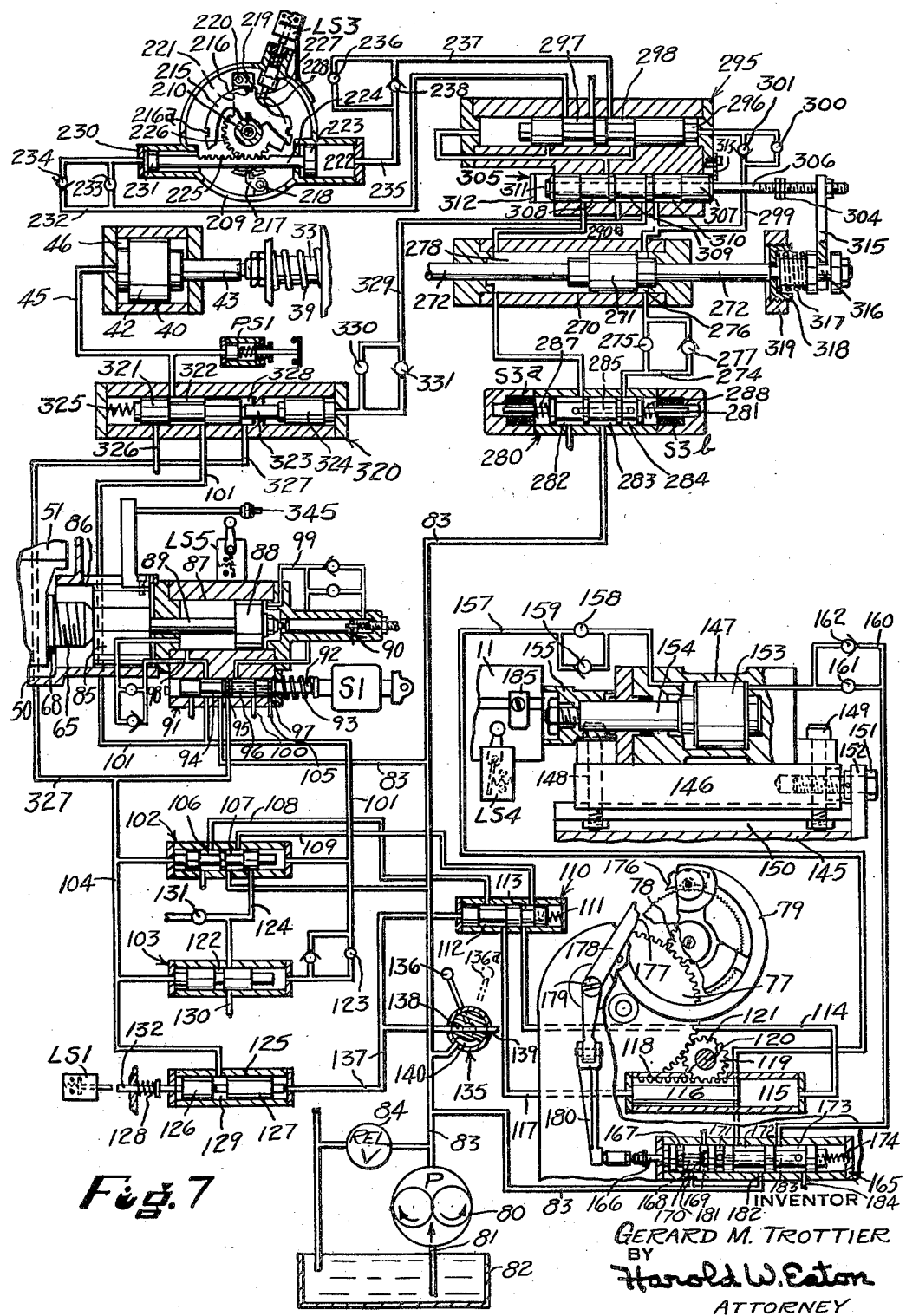

Nov. 19, 1957  G. M. TROTTIER  2,813,379
GRINDING MACHINE
Filed May 17, 1956  5 Sheets-Sheet 5
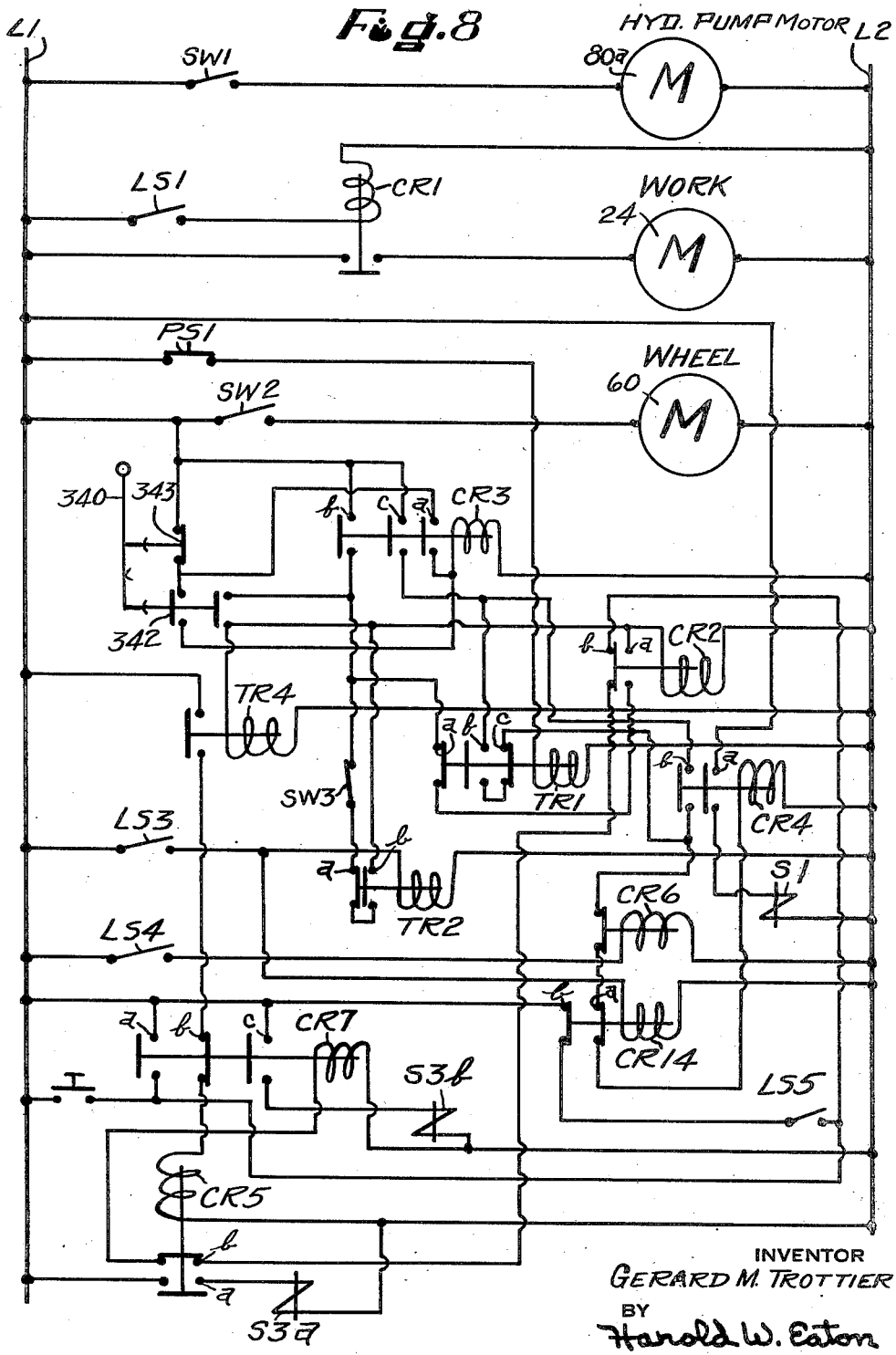
INVENTOR
GERARD M. TROTTIER
BY
Harold W. Eaton
ATTORNEY

United States Patent Office 2,813,379
Patented Nov. 19, 1957

2,813,379

GRINDING MACHINE

Gerard M. Trottier, Worcester, Mass., assignor to Norton Company, Worcester, Mass., a corporation of Massachusetts Application May 17, 1956, Serial No. 585,438

13 Claims. (Cl. 51—105)

The invention relates to grinding machines, and most particularly to an automatically operated cylindrical grinding machine.

One object of the invention is to provide a simple and thoroughly practical automatically operated grinding machine. Another object is to provide a grinding machine in which a plurality of surfaces on a cylindrical work piece may be simultaneously ground. Another object is to provide an automatically operated work loading mechanism for loading successive work pieces onto a work supporting collet before grinding and removing them therefrom after grinding.

Another object is to provide an indexable work turret to position work pieces to be ground on the work collet before grinding and to remove them therefrom after a grinding operation has been completed. Another object is to provide a fluid motor actuated in timed relation with the infeeding movement of the grinding wheel to impart a longitudinal axial traversing movement to the work piece relative to the grinding wheel after the infeeding movement of the grinding wheel has been complete. A further object is to provide an indexably axially movable work turret to convey successive work pieces from a work chute onto the work supporting chuck before grinding and to support ground work pieces in a discharge chute after grinding. Other objects will be in part obvious or in part pointed out hereinafter.

One embodiment of the invention has been illustrated in the drawings in which;

Fig. 1 is a front elevation of the grinding machine;

Fig. 2 is a plan view of the grinding machine;

Fig. 5 is a vertical sectional view on an enlarged scale through the work loading and discharging mechanism;

Fig. 6 is a fragmentary detailed view, on an enlarged scale, showing the cam and follower mechanism for actuating the latch on the work loading chute;

Fig. 7 is a hydraulic diagram of the actuating mechanisms and the controls therefor;

Fig. 8 is an electric wiring diagram; and

Fig. 9 is a diagrammatic view, on an enlarged scale, showing the relationship of the grinding wheels and the work piece.

Figure 3:
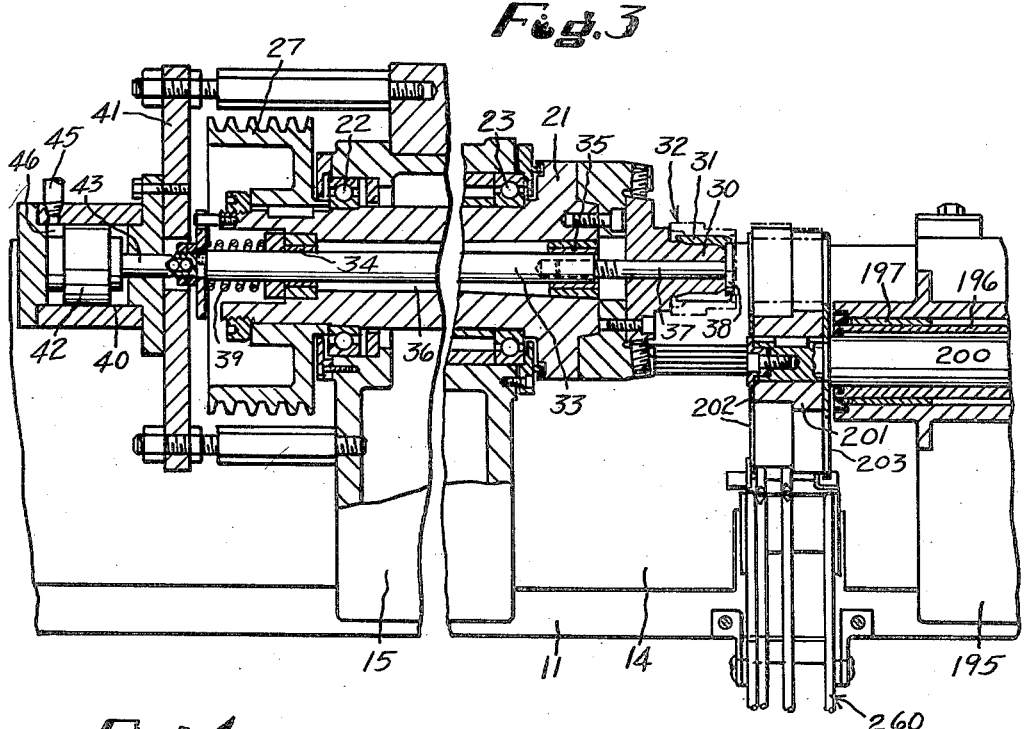
Fig. 3 is a fragmentary horizontal sectional view, on an enlarged scale, taken approximately on the line 3—3 of Fig. 1.

A grinding machine has been illustrated in the drawings comprising a base 10 which serves as a support for a longitudinally movable work table 11. The work table 11 is arranged to slide longitudinally on a flat way 12 and a V-way 13 formed on the upper surface of the table 11. A conventional swivel table 14 is mounted on top of the longitudinally movable table 11. The swivel table 14 serves as a support for a work head 15 for rotatably supporting a work piece for a grinding operation.

A manually operable traverse wheel 20 is provided to facilitate a longitudinal manual adjustment of the table 11 relative to the base 10. This traverse mechanism is an old and well known expedient in a grinding machine and may be identical with that shown in the expired U. S. patent to Charles H. Norton, No. 762,838, dated June 14, 1904.

The work head 15 is provided with a rotatable work spindle 21 (Fig. 3) which is journalled in spaced anti-friction bearings 22 and 23 supported within the work head 15. A driving mechanism is provided for the spindle 21 comprising an electric motor 24 mounted on the upper surface of the work head 15. The motor 24 is provided with a multiple V-groove pulley 25 which is connected by multiple V-belts 26 with a multiple V-groove pulley 27 mounted on the left hand end of the work spindle 21.

The work spindle 21 is provided with a nose piece 30 which is provided with a cylindrical end portion having a frusto-conical and cylindrical face to support an expansible work receiving collet 31 to support a work piece 32 for a grinding operation. The spindle 21 contains a slide rod 33 which is journalled in spaced bearings 34 and 35 supported within a central aperture 36 within the work spindle 21. A rod 37 is connected to the right hand end of the rod 33 and is provided with an enlarged head 38 for engaging the right hand end of the collet 31. A compression spring 39 is provided for urging the rod 33 in a direction toward the left (Fig. 3) to shift the expansible collet 31 toward the left to clamp the work piece 32 thereon for a grinding operation.

A fluid pressure operated release is provided for the collet 31 comprising a cylinder 40 which is fixedly mounted on a plate 41. The plate 41 is adjustably mounted on the work head 15. The cylinder 40 contains a slidably mounted piston 42 which is connected to the right hand end of a piston rod 43. An anti-friction connection including a ball 44 is provided between the piston rod 43 and the slide rod 33. When fluid under pressure is passed through a pipe 45 into a cylinder chamber 46 at the left hand end of the cylinder 40, the piston 42 together with the piston rod 43 moves toward the right to impart a corresponding movement to the rod 33 toward the right to release the end pressure on the expansible collet 31 to facilitate removal of a ground work piece 32 and the insertion of a new work piece thereon to be ground.

The base 10 also supports a wheel slide base 50 which is fixedly mounted on the base 10 in the desired position relative to the axis of the work spindle 21. The wheel slide base 50 supports a transversely movable wheel slide 51. The wheel slide is arranged to slide transversely on the slide base 50 on a flat way 52 and a V-way 53 (Fig. 2). The wheel slide 51 is provided with a wheel spindle 54 which is journalled in suitable bearings (not shown) within the wheel slide 51. As illustrated in the drawings the wheel spindle 54 supports a pair of spaced grinding wheels 55 and 56. The wheel slide base 50 as illustrated in Fig. 2 is angularly positioned so that the wheel slide 51 moves angularly relative to a plane normal to the axis of the work piece being ground.

A driving mechanism is provided for a wheel spindle 54 comprising an electric motor 60 mounted on the upper surface of the wheel slide 51. The motor is provided with a multiple V-groove pulley 61 which is connected by multiple V-belts 62 with a multiple V-groove pulley 63 mounted on the left hand end of the wheel spindle 54.

A feeding mechanism is provided for imparting a transverse feeding movement to the wheel slide 51 comprising a rotatable feed screw 65 (Fig. 2). The lower end of the feed screw 65 (Fig. 2) is slidably keyed within a rotatable sleeve 66 which is journaled in anti-friction bearings 67 carried by the wheel slide base 50. A feed nut 68 depends from the under side of the wheel slide 51 and meshes with or engages the feed screw 65. A bevel gear 69 is mounted on the lower end of the sleeve 66 and meshes with a bevel gear 70 mounted on a rotatable shaft 71. The shaft 71 is journalled in spaced anti-friction bearings 72 and 73. The shaft 71 is provided with a bevel gear 74 (Fig. 2) which meshes with a bevel gear 75. The bevel gear 75 is mounted on the upper end of a rotatable shaft 76 which is journalled in suitable bearings (not shown) supported within the base 10. The downward end of the shaft 76 is provided with a gear 77 which meshes with a gear 78. A rotatable feed wheel 79 is mounted on the front of the machine base and is connected to impart a rotary motion to the gear 78. It will be readily apparent from the foregoing disclosure that a rotary motion of the feed wheel 79 will be imparted through the mechanism above described to cause a transverse movement of the wheel slide 51. The direction of rotation of the feed wheel 79 serves to determine the direction of movement of the wheel slide 51.

A fluid pressure system is provided for supplying fluid under pressure to the various mechanisms of the machine. This system comprises a motor driven fluid pump 80 which draws fluid through a pipe 81 from a reservoir 82 and passes fluid under pressure through a pipe 83. A relief valve 84 is connected to the pipe 83 to facilitate by-passing excess fluid under pressure directly to the reservoir 82 to facilitate maintaining a predetermined operating pressure within the system.

The rear end of the feed screw 65 is connected to a slidably mounted sleeve 85 which is slidably keyed within a cylindrical aperture 86 (Fig. 7).

In order to provide a rapid positioning movement for the wheel slide 51, a hydraulically operated mechanism is provided comprising a cylinder 87 which is arranged in axial alignment with the feed screw 68. The cylinder 87 contains a slidably mounted piston 88 which is connected to the right hand end of a piston rod 89. A dash pot 90 is provided to facilitate cushioning the rearward movement of the piston 88 and the wheel slide 51.

A control valve 91 is provided for controlling the admission to and exhaust of fluid from the cylinder 87. The control valve 91 is a piston type valve comprising a valve stem 92 having a plurality of spaced valve pistons formed integrally therewith to form a plurality of valve chambers 94, 95, 96 and 97. A compression spring 93 serves normally to hold the valve stem 92 in a right hand end position as illustrated in Fig. 7. A solenoid S1 is provided which when energized serves to shift the valve 91 into a left hand end position so as to reverse the flow of fluid to the cylinder 87. In the position of the valve 91 (Fig. 7) fluid from the pressure pipe 83 enters the valve chamber 94 and passes through a passage 98 into a cylinder chamber formed at the left hand end of the cylinder 87 to move the piston 88 rearwardly in an inoperative position, that is, toward the right (Fig. 7) into the position illustrated.

During the movement of the piston 88 toward the right, fluid within the cylinder chamber at the right hand end of the cylinder 87 may exhaust through a passage 99 into the valve chamber 96 and exhausts through an exhaust pipe 100 into the reservoir 82.

A suitable feeding mechanism is provided for imparting a rotary motion to the feed screw 65 to move the wheel slide 51 transversely at a suitable rate for a grinding operation. This mechanism is substantially identical to that shown in the prior U. S. patent to H. A. Silven and C. G. Flygare, No. 2,522,485, dated September 12, 1950, to which reference may be had for details of disclosure not contained herein. A pipe 101 is connected to the control valve 91 and also to the right hand ends of a grinding feed control valve 102 and a backlash control valve 103 to maintain these valves in a left hand end position when the feed control valve is in the position illustrated in Fig. 7. A pipe 104 is connected between the control valve 91 and the left hand ends of the grinding feed control valve 102 and the backlash valve 103 to facilitate exhausting fluid from the left hand end chambers of the grinding feed control valve 102 and the backlash valve 103. In the position illustrated in the drawings fluid exhausting from the left hand ends of valves 102 and 103 passes through the valve chamber 95 in the valve 91, through a central passage within the valve stem 92, into the valve chamber 97 and exhausts through an exhaust pipe 105 into the reservoir 82.

The feed control valve 102 is a shuttle-type valve having a slidably mounted valve member formed with a plurality of spaced integral valve pistons arranged to form valve chambers 106 and 107. A pipe 108 and a pipe 109 are connected between the feed control valve 102 and a by-pass valve 110. The by-pass valve 110 is normally held in a left hand end position by means of a compression spring 111. This valve is provided with a slidably mounted valve member having a plurality of integral valve pistons forming a pair of valve chambers 112 and 113. A pipe 114 is connected between the by-pass valve 110 and the right hand end of a feed cylinder 115. The feed cylinder 115 contains a slidably mounted piston 116. A pipe 117 is connected between the by-pass valve 110 and the left hand end of the grinding feed cylinder 115. The piston 116 is provided with rack teeth 118 which mesh with a gear 119 mounted on a rotatable shaft 120. The shaft 120 is also provided with a gear 121 which meshes with the gear 77 so that when the piston 116 is moved in either direction, a rotary motion will be imparted through the gear mechanism above described to rotate the feed screw 65. In the position of the valves 102 and 110 (Fig. 7) fluid under pressure is passed through the pipe 114 into the right hand end of the feed cylinder 115 to move the piston 116 toward the left which causes a rotary motion of the feed screw 65 to cause a rearward movement of the wheel slide 51 to an inoperative position.

When the solenoid S1 is energized to shift the control valve 91 toward the right to initiate a rapid approaching movement of the wheel slide 51 and the grinding wheels 55—56, fluid under pressure from the pipe 83 will be passed into the valve chamber 96. From the valve chamber 96 fluid passes through the passage 99 to the right hand end of the cylinder 87 to start a rapid approaching movement of the piston 88. At the same time fluid under pressure is passed through the pipe 104 to move both the grinding feed control valve 102 and the backlash valve 103 toward the right (Fig. 7). With the valve 102 in a right hand end position fluid under pressure from the pipe 83 passes into the valve chamber 106, through the pipe 108, through the chamber 112 in the by-pass valve 110, through the pipe 117 into the left hand end of the cylinder 115 to start the piston 116 moving toward the right so as to rotate the feed screw 65 to cause a forward movement of the wheel slide 15 at a rate of speed suitable for grinding.

At the start of an infeeding movement of the wheel slide 51, it is desirable to rapidly take up the backlash in the feed mechanism parts before the grinding wheels 55 and 56 engage the work piece to be ground. This is preferably accomplished by the backlash valve 103 which is a piston type valve having a slidably mounted valve member formed with a pair of spaced integral valve pistons which form a valve chamber 122. When fluid under pressure is passed through the pipe 104 to start a grinding feed, the valve 103 moves toward the right at a rate controlled by a throttle valve 123. Fluid exhausting from the right hand end of the cylinder 115, exhausts through the pipe 114, through the valve chamber 113 in the valve 111, through the pipe 109 into the valve chamber 107 in the feed control valve 102 may exhaust through a pipe or passage 124 through a throttle valve 131 into the reservoir 82, and also exhaust to the backlash valve 103. As the valve 103 moves toward the right, fluid exhausting through the pipe 124 may pass through the valve chamber 122 as it moves across the end of the pipe 124 which allows a substantially unrestricted exhaust of fluid through a pipe 130. This allows an initial rapid rotation of the feed screw to take up the backlash in the feed mechanism parts. After the valve chamber 122 passes over the port at the end of the passage 124, exhaust of fluid is cut off from the by-pass valve 103 and fluid exhausting through the pipe 124 thereafter exhaust through a throttle valve 131 which may be adjusted to produce the desired rate of infeeding of the wheel slide 51 so as to produce the desired grinding feed. It will be readily apparent that the rate of movement of the valve 103 toward the right as controlled by the throttle valve 123 determines the amount of unrestricted exhaust of fluid through the chamber 122.

A cylinder 125 is provided with a pair of spaced independent pistons 126 and 127. The pistons 126 and 127 are spaced from each other to form a cylinder chamber 129 which is connected to the pipe 104. When fluid under pressure is passed through the pipe 104 to initiate an infeeding movement of the grinding wheel, fluid enters the cylinder chamber 129 and moves the piston 126 toward the left against the compression of a spring 128 so that a piston rod 132 actuates a limit switch LS1 to close a circuit thereby energizing a relay switch CR1 to start the work drive motor 24. In the position of the valves 91, 102 and 103, fluid within the cylinder chamber 129 is exhausted by the released compression of the spring 128 to open limit switch LS1 thereby breaking the circuit to stop the work drive motor 24 when the wheel slide 51 is moved to a rearward position.

It may be desirable to render the cylinder 115 inoperative in setting up the machine so that the feeding movement of the wheel slide may be manually controlled by the feed wheel 79. In order to accomplish this result, a rotary type selector valve 135 is provided having a manually operable control lever 136. As shown in Fig. 7 fluid from the left hand end of valve 110 and from the right hand end of cylinder 125 may exhaust through a pipe 137, through a passage 138 in the selector valve 135 and exhausts through a pipe 139 into the reservoir 82. If it is desired to render the cylinder 115 inoperative, the control lever 136 is shifted in a clockwise direction into broken line position 136a so that fluid under pressure from the pipe 83 may pass through a valve chamber 140, through the pipe 137 into the left hand end chamber of the valve 110 to shift the valve 110 toward the right against the compression of the spring 111. In the right hand position of the valve 110, pipes 108 and 109 are cut off, and the pipes 114 and 117 are both connected to the valve chamber 112 so that fluid may readily by-pass from one end of the cylinder 115 to the other thereby facilitating a manual operation of the feed wheel 79.

With the valve 135 in this position, fluid under pressure from the valve chamber 140 passing through the pipe 137 enters the right hand end chamber in the cylinder 125 to move the pistons 127 and 126 toward the left against the compression of the spring 128 to actuate the limit switch LS1 thereby closing the circuit above described to start the work drive motor 24.

In grinding the work piece 32 (Fig. 3), the large and small diameters together with the shouldered face are simultaneously ground by a plunge cut grinding operation, that is, a direct infeed of the wheel slide 51. When the work has been ground to the desired size, it is desirable to impart a slight longitudinal movement to the table 11 so that the grinding wheel 55 will traverse across any remaining portion of the larger diameter adjacent to the shoulder not previously ground. This is preferably accomplished by a hydraulically operated mechanism as illustrated in Figs. 1, 2 and 7. A block 145 is fastened to the base 10 between the flat way 12 and the V-way 13. The block 145 serves as a support for an adjustable slide block 146 (Fig. 7) which supports a cylinder 147. The slide block 146 is held in adjusted position on the block 145 by a plurality of clamping screws or bolts 148 and 149 which pass through the slide block 146 and have nuts slidably supported within a T-slot 150 formed in the upper portion of the block 145. An adjusting screw 151 is rotatably supported by a bracket 152 fastened to the right hand end of the block 145. The screw 151 is screw threaded into the slide block 146. It will be readily apparent from the foregoing disclosure that the cylinder 147 together with the slide block 146 may be adjusted longitudinally relative to the base 10 by loosening the clamping bolts 148 and 149 and then manually adjusting the screw 151 to position the cylinder 147 in the desired position.

The cylinder 147 contains a slidably mounted piston 153 which is connected to the right hand end of a piston rod 154. The left hand end of the piston rod 154 is connected to a bracket 155 which is fastened to the right hand end of the table 11 by screws 156. A pipe 157 is connected through a throttle valve 158 and a ball check valve 159 with the left hand end of the cylinder 147. Similarly a pipe 160 is connected through a throttle valve 161 and a ball check valve 162 with the right hand end chamber of the cylinder 147.

A suitable control valve is provided for controlling the admission to and exhaust of fluid from the cylinder 147 comprising a piston type valve 165 which is actuated by and in timed relation with the wheel feeding mechanism. The valve 165 is a two-part valve comprising a valve stem 166 having a pair of spaced valve pistons forming a valve chamber 167. A central passage 168 connects the valve chamber 167 with a chamber 169 between two parts of the valve 165. The second part of the valve 165 comprises a valve stem 170 having a plurality of spaced valve pistons forming a plurality of valve chambers 171, 172 and 173. A compression spring 174 serves normally to hold the two parts of the valve 165 in a left hand end position.

The valve 165 is preferably actuated by and in timed relation with the movement of the feed wheel 79. An adjustable cam 176 carried by the feed wheel 79 engages a cam 177 on a feed pawl 178 when the feed wheel is rotated in a counter-clockwise direction for an infeeding movement of the wheel slide 51. The feed pawl 178 is pivotally supported by a stud 179 on the front of the machine. The feed pawl is provided with a downwardly extending lever or arm 180 which is arranged to actuate the valve stem 166 in timed relation with the rotation of the feed wheel 79.

During the movement of the piston 116 toward the right to cause an infeeding movement of the wheel slide 51 together with the grinding wheels 55 and 56 continues until the work piece has been ground to a predetermined size. As the feed wheel approaches this position, the cam 176 engages cam 177 and rocks the pawl 178 together with arm 180 in a counter-clockwise direction so that the valve stem 166 is moved toward the right (Fig. 7). This movement continues until a port 181 is opened to admit fluid under pressure to the valve chamber 167. Fluid under pressure entering the valve chamber 167 passes through the central aperture 168 into the valve chamber 169 to move the valve stem 170 toward the right away from the first part of the valve. This movement continues until a second port 182 passes fluid from the pipe 83 into the valve chamber 172, through the pipe 160, through both the ball check valve 162 and the throttle valve 161 into the cylinder chamber formed at the right hand end of the cylinder 147 to move the piston 153 together with the table 11 toward the left (Fig. 7). The piston 153 together with the table 11 moves toward the left at a rate controlled by the throttle valve 158. Fluid exhausting from the left hand end of the cylinder 147 passes into the valve chamber 171, through a central passage 183 into the valve chamber 173 and exhausts through an exhaust pipe 184 into the reservoir 82. During this movement of the table 11 toward the left, an adjustable table dog 185 actuates and closes a limit switch LS4 which will be hereinafter described.

Similarly when the solenoid S1 is deenergized and the piston 88 together with the valves 102 and 103 together with the feed piston 116 reset into the positions illustrated in Fig. 7 after a grinding operation has been completed, the released compression of the spring 174 returns the valve 165 to the position illustrated in Fig. 7 so that fluid under pressure from the pipe 83 enters the valve chamber 172, passes through the pipe 157, through both the ball check valve 159 and the throttle valve 158 into the chamber at the left hand end of the cylinder 147 to move the piston 153 together with the table 11 toward the right into the position illustrated in Fig. 7 at a rate controlled by the throttle valve 161.

An automatic work loading mechanism is provided for conveying work pieces onto the collet 31 before a grinding operation and removing them therefrom after a grinding operation has been completed. This mechanism comprises a rotary turret mechanism including a frame 195 which is adjustably clamped onto the swivel table 14. The frame 195 supports a rotatable hollow spindle 196 (Figs. 3 and 4) which is journalled in spaced bearings 197 and 198.

The spindle 196 is provided with a central bore which supports a slidably keyed spindle 200. A work turret 201 having adjacent side plates 202 and 203 is fixedly mounted on the left hand end of the spindle 200 (Fig. 3). The work turret 201 is provided with a plurality of work apertures 204, 205, 206 and 207 (Fig. 5). The work apertures 204, 205, 206 and 207 are shaped to correspond with the work piece to be ground so as to give the work piece support during the loading and unloading operation. The side plates 202 and 203 are provided with apertures so that when the turret 201 is moved toward the left (Fig. 3) the side plate 203 will engage the right hand end face of the work piece 32 and push it onto the collet 31. The side plates 202 and 203 are a sufficient distance apart so that after the work piece has been inserted on the collet 31, the turret 201 may be moved a slight distance toward the right so that the side plate 203 is out of engagement with the work piece during a grinding operation. After a work piece has been ground, the turret 201 is moved toward the right, after the collet 31 has been collapsed. During this movement, the side plate 202 pulls the ground work piece from the collet 31.

Figure 4:
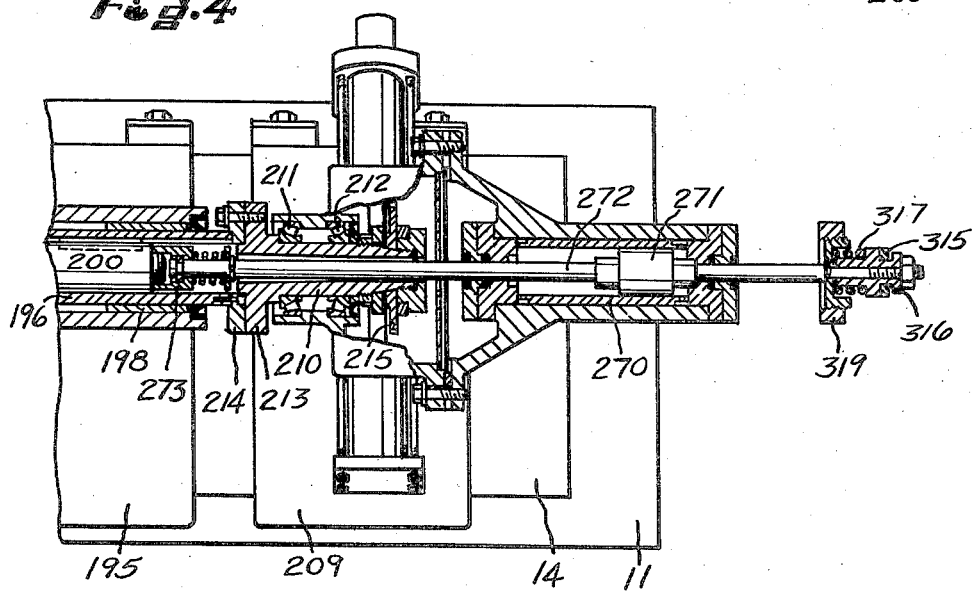
Fig. 4 is a fragmentary horizontal sectional view on an enlarged scale, taken approximately on the line 4—4 of Fig. 1.

A suitable indexing mechanism is provided for rapidly indexing the turret 201. This indexing mechanism may be of a standard commercial variety such as for example that manufactured by the Erickson Tool Company of Cleveland, Ohio, and covered by U. S. patent to M. L. Benjamin and F. E. Winnen, No. 2,600,960, dated June 17, 1952, to which reference may be had for details of disclosure not contained herein. This indexing mechanism as illustrated in Figs. 4 and 7 comprises a frame 209 which is adjustably clamped onto the swivel table 14. The frame 209 supports a rotatable spindle 210 in a pair of spaced anti-friction bearings 211 and 212. The left hand end of the spindle 210 is provided with an integral flange 213 which is fixedly connected to a flange 214 mounted on the right hand end of the hollow spindle 196 (Fig. 4). The indexing mechanism comprises an index plate 215 which is keyed onto the spindle 210. The index plate 215 is provided with a plurality of notches 216 which in the present case are arranged 90° apart so that for each indexing movement the work turret is indexed through 90°. A holding pawl 217 is pivotally supported by a stud 218 on the frame 209. An actuated pawl 219 is supported by a stud 220 on an actuating member 221 which is rotatably supported relative to the spindle 210.

A hydraulically operated mechanism is provided for actuating the pawl carrying member 221 comprising a cylinder 222 which contains a slidably mounted piston 223. The piston 223 is mounted on the right hand end of a piston rod 224. The piston rod 224 is provided with rack teeth 225 which mesh with a gear segment 226 formed on the pawl carrying member 221. The parts as shown in Fig. 7 are shown in an indexed position with a spring pressed stop pawl 227 engaging a notch 228 formed on the pawl carrying member 221.

A reset cylinder 230 contains a slidably mounted piston 231 which is fixedly mounted on the left hand end of the pitson rod 224. When fluid under pressure is passed through a pipe 232, through a throttle valve 233 and a ball check valve 234 into a cylinder chamber formed at the left hand end of the reset cylinder 230, the piston 231 together with the piston rod 224 will be moved toward the right (Fig. 7) to impart a counterclockwise rotary motion to the pawl carrying member 221. During this movement of the pawl carrying member 221, the pawl 219 rides out of the notch 216 and turns through 90° and drops into a notch 216a readily for the next indexing movement of the turret. During this movement the stop pawl 227 rides out of the notch 228. During this resetting movement fluid exhausts from a cylinder chamber at the right hand end of cylinder 222, through a pipe 235, through a throttle valve 236 and through a pipe 237. The speed of the reset is regulated by manipulation of the throttle valve 236.

When it is time for an indexing movement of the turret 201, fluid under pressure is passed through the pipe 237, through both the throttle valve 236 and the ball check valve 238 and through the pipe 235 into the right hand end chamber of the cylinder 222 to move the piston 223 toward the left. This movement causes a clockwise rotary motion to be imparted to the pawl carrying member 221 which turns the index plate 215 together with the spindle 210, the hollow spindle 196 to impart a rotary indexing movement to the work turret 201 to index it through 90° to position the next work piece 32 to be ground into axial alignment with the work collet 31.

During this indexing movement, fluid within the left hand end chamber of the reset cylinder 230 exhausts through the throttle valve 233 and through the pipe 232. By manipulation of the throttle valve 233, the rate of indexing movement may be readily controlled. Similarly during the reset operation, manipulation of the throttle valve 236 serves to regulate the rate of movement of the resetting operation.

A plurality of work pieces 32 to be ground are loaded either manually or automatically into a loading chute 250. The chute 250 is supported by a bracket 251 which is clamped onto the work head 15 (Fig. 5). A pivotally mounted work holding pawl 252 is supported by a stud 253 which is mounted on the bracket 251. A tension spring 254 is connected between a stud 255 on the bracket 251 and a stud 256 on the upper end of the pawl 252. The spring 254 serves normally to maintain the pawl 252 in the full line position (Fig. 5) so as to hold the work pieces 32 from sliding toward the turret 201.

A cam operated mechanism is provided for actuating the pawl 252. The lower end of the pawl 252 is provided with a follower roller 257 (Fig. 5). Cam surface 258 (Fig. 6) is provided on the turret 201 adjacent to each of the work apertures 204, 205, 206, and 207. When the turret 251 is removed axially to load a work piece onto the collet 31, the cam 258 moves toward the left (Fig. 6) from the full line position into the broken line position 258a. During this movement, the cam 258 engages the follower roller 257 and rocks the pawl 252 in a clockwise direction (Fig. 5) so as to release the lower work piece 32 in the chute 250 to allow it to roll into the work aperture 204 in the turret 201. As the pawl 252 swings in a clockwise direction, a stop surface 259 swings into the path of the next work piece 32 so that the column of work pieces are held in the chute 250.

The pawl 252 remains in this position until a work piece 32 has been ground after which the turret 201 is moved toward the right to withdraw a ground work piece 32 from the collet 31. During this movement, the cam 258 moves toward the right (Fig. 6) into the full line position thereby releasing the tension of the spring 254 which serves to rock the pawl 252 in a counterclockwise direction (Fig. 5) so that the next work piece 32 to be ground may roll downwardly into a loading position in engagement with the pawl 252.

A fluid pressure actuating mechanism is provided for moving the turret 201 axially comprising a cylinder 270 (Figs. 4 and 7) which contains a slidably mounted piston 271. The piston 271 is fixedly mounted on a double end piston rod 272. The left hand end of the piston rod 272 is rotatably connected to a sleeve 273 (Fig. 4) which is screw threaded onto the right hand end of the spindle 200.

A solenoid-actuated control valve 280 (Fig. 7) is provided to control the admission to and exhaust of fluid from the cylinder 270. The valve 280 is a piston type valve having a slidably mounted valve member 281 which is provided with a plurality of spaced integral valve pistons forming spaced valve chambers 282, 283, and 284. The valve member 281 is provided with a central passage 285 which connects the valve chamber 282 with the valve chamber 284. A pair of balanced compression springs 287 and 288 serve normally to hold the valve member 281 in a central position, as illustrated in Fig. 7. A solenoid S3a and a solenoid S3b are operatively connected so that when energized the valve member 281 is shifted toward the right or toward the left respectively.

A control valve 295 is provided for controlling the admission to and exhaust of fluid from the turret index cylinders 222 and 230. The valve 295 is a fluid-actuated piston-type valve having a slidably mounted valve member 296. The valve member 296 is provided with a plurality of spaced integral valve pistons forming a pair of spaced valve chambers 297 and 298. A pipe 299 connects the cylinder 270 with the right hand end of the valve 295. A throttle valve 300 and a ball check valve 301 are provided in the pipe 299 so that the fluid under pressure may be substantially unrestricted from the cylinder 270 into the right hand end of the valve 295 to move the valve member 296 toward the left (Fig. 7).

A pilot valve 305 is provided for controlling the admission to and exhaust of fluid from the left hand end of the valve 295. The valve 305 comprises a slidably mounted rod 306 which is free to slide within a central aperture formed in a slidably mounted valve member 307. The valve member 307 is provided with a plurality of spaced integral valve pistons forming a plurality of spaced valve chambers 308, 309, and 310. The rod 306 is provided with a head 311 on its left hand end which is arranged to engage the left hand end of the valve member 307 to move it toward the right until the right hand end thereof engages a stop 313. The slide rod 306 is provided with a pair of nuts 304 which are arranged to engage the right hand end of the valve member 307, after lost motion is taken up, to shift the valve member 307 toward the left until it engages a stop 312. The stops 313 and 312 serve to determine the extent of movement of the valve member 307.

The slide rod 306 is moved by and in timed relation with the piston 271. A vertically arranged arm 315 is adjustably supported at its upper end by the rod 306 (Fig. 7). The lower end of the arm 315 is yoke-shaped and arranged to engage the groove in a spool-shaped member 316. The spool-shaped member 316 is adjustably mounted on the right hand end of the piston rod 272. A compression spring 317 is interposed between the spool-shaped member 316 and an adjustable collar 318 which is carried by the piston rod 272. The outer surface of the collar 318 is screw threaded and supports an adjustable stop collar 319. There is a slight amount of lost motion provided between the spool-shaped member 316 and the piston rod 272. When the piston 271 moves toward the left, the arm 315 together with the slide rod 306 are also moved toward the left. During this movement, the nuts 304 engage the end of the valve member 307 and moves it toward the left into engagement with the stop 312. As the parts approach this position, the collar 319 moves into engagement with the right hand end of the cylinder 270 after which the spring 317 is compressed. The movement of the piston 271 toward the left serves to cause an axial movement of the turret 201 to the left into the broken line position 201a (Fig. 6) so as to position a new work piece to be ground on the collet 31. The collet actuating mechanism, to be hereinafter described then expands the collet 31 to grip and hold the work piece 32 during a grinding operation.

After the collet has gripped the work piece, the solenoid S3a is deenergized and the spring 288 moves valve member 281 to the position illustrated in Fig. 7 after which fluid may exhaust from the cylinder chamber 276 at the right hand end of the cylinder 270, and the released compression of the spring 317 moves the turret 201 a slight distance toward the right (Fig. 3) so that the side plate 203 of the turret 201 is out of engagement with the right hand end of the work piece 32 during a grinding operation.

A control valve 320 is provided for controlling the admission to and exhaust of fluid from the collet actuating cylinder 40 and the pressure switch PS1. The valve 320 is a two part valve comprising a slidable valve member 321 having a pair of spaced integral valve pistons forming a valve chamber 322. The valve 320 contains a second slidably mounted valve member 323 having a integral valve piston 324. The valve members 321 and 323 are normally held in a right hand end position by means of a compression spring 325. An exhaust pipe 326 is connected to the valve 320 to facilitate exhausting fluid from the chamber 46 of the cylinder 40 and from the pressure switch PS1 when the valve member 321 is in a left hand end position.

A pipe 327 is connected between the feed control valve 91 and a valve chamber 328 in the valve 320. A pipe 329 is connected between the pilot valve 305 and the right hand end of the valve 320. A throttle valve 330 and a ball check valve 331 are provided in the pipe 329 so that fluid may pass, at a rate controlled by the throttle valve 330, from the valve 305 into the right hand end chamber of the valve 320 to move the valve members 321 and 323 into a left hand end position against the compression of the spring 325. When the valve 305 is moved from the position illustrated in Fig. 7, the throttle valve 330 together with the ball check valve 331 allow substantially unrestricted exhaust of fluid from the right hand end chamber of the valve 320, through the valve chamber 309 in the valve 305, and through an exhaust pipe 290 into the reservoir 82.

When a solenoid S3a is energized, the valve member 281 is shifted toward the right (Fig. 7) so that fluid under pressure from the pipe 83 passes through the valve chamber 283, through the pipe 274, through the throttle valve 275 into the cylinder chamber 276 to move the piston 271 together with the turret 201 toward the left so as to load work piece 32 to be ground onto the collet 31. During this movement, after lost motion has been taken up, the nuts 304 engage the right hand end of the valve member 307 and shifts it into a left hand end position in engagement with the stop 312. In this position of the valve 305, fluid under pressure passes from the cylinder chamber 276, through the pipe 299 into the valve chamber 310, through pipe 329, and through the throttle valve 330 to shift the valve members 323 and 321 into a left hand end position. In this position of the valve 320, the released compression of the spring 39 moves the piston 42 toward the left to expand the collet 31 so as to hold a work piece 32 during a grinding operation. Movement of the piston 42 toward the left exhausts fluid from the cylinder chamber 322, and through the exhaust pipe 326 into the reservoir 82.

When the solenoid S1 is energized to initiate an infeeding movement of the wheel slide 51, the feed control valve 91 is shifted toward the left so that fluid under pressure from the pipe 83 enters the valve chamber 96 and passes through the pipe 99 into the right hand end of the cylinder 87 to initiate movement of the piston 88 together with the wheel slide 51 rapidly toward a grinding position. At the same time fluid entering the valve chamber 96 passes through the pipe 104 to shift the valves 102 and 103 toward the right thereby initiating a movement of the feed piston 116 toward the right to impart a rotary motion to the feed screw 65. Fluid under pressure passing through the pipe 104 also enters the chamber 129 in the cylinder 125 to shift the piston 126 toward the left so as to close the limit switch LS1 thereby starting the work driving motor 24. Fluid under pressure passing through the pipe 104 also passes through the pipe 327 into the valve chamber 328 to hold the valve member 321 in a left hand end position so as to maintain the collet 31 expanded even though the solenoid S3a is thereafter deenergized.

A diagrammatic view has been illustrated in Fig. 9 to show the relationship of the grinding wheels 55—56 to the work piece 32. The grinding wheels 55 and 56 are slightly spaced from each other in order to facilitate truing the grinding wheel 56 to the desired shape so that when fed toward the axis of the work piece 32 the face 56b will grind the cylindrical surface 32b on the work piece 32 and the face 56a will grind the shoulder face 32a on the work piece 32. At the same time the operative face of the grinding wheel 55 grinds susbtantially the cylindrical face 32c of the work piece 32. After the work faces 32a, 32b, and 32c are ground to the desired predetermined size, the work table 11 is moved longitudinally toward the left (Fig. 1) so that the work piece 32 is moved in an axial direction toward the left during which movement the operative face of the grinding wheel 55 grinds the right hand end portion of the cylindrical surface 32c which was not ground during the infeeding movement of the grinding wheels.

Briefly the operation of the grinding machine is as follows: a plurality of work pieces 32 are loaded either manually or automatically into the work chute 250 which intermittently loads succesisve work pieces into the apertures 204, 205, 206, and 207 of the turret 201. The turret 201 is indexed automatically successively to such work pieces 32 to be ground into axial alignment with the work collet 31. The turret 201 is moved axially to load a work piece 32 onto the collet 31 which is thereafter automatically expanded to hold the work piece during a grinding operation. The wheel slide 51 is then fed forward, first at a rapid positioning rate until the grinding wheels 55—56 are in close proximity to the surface of the work piece at which time the infeed is continued at a slower grinding rate to grind the surfaces of the work piece 32 to a predetermined size. The wheel slide 51 then moves rearwardly to an unoperative position, the work collet 31 is contracted, the work turret 31 moves axially in the opposite direction to remove the ground work piece from the collet 31, the turret 201 is then indexed through 90° to position the next work piece 32 to be ground into axial alignment with the collet 31. After each indexing movement of the turret 201, a ground work piece rolls from one of the work apertures 204, 205, 206, or 207 in the turret 201 into the work discharge chute 260.

Describing now the operation of the electrical controls as shown in Figs. 7 and 8, when it is desired to start the grinding machine the switch SW1 is closed to start the pump driving motor 80a to supply fluid under pressure to the system. When the pump 80 is started fluid under pressure is passed through the feed control valve 91, through the valve 320 into the cylinder chamber 46 of the cylinder 40 to unclamp or contract the work collet 31 and also to open the pressure switch PS1. A switch SW2 is then closed to start the grinding wheel driving motor 60. If it is desired to have an automatic cycle of operation, a switch SW3 is closed.

To start the automatic cycle of the machine, a control lever 340 which is pivotally supported by a stud 341 on the front of the machine base 10 is rocked in a counter clockwise direction (Fig. 8) momentarily to close a start switch 342. A stop switch 343 is provided which may be actuated by a clockwise movement of the control lever 340. The momentary closing of the start switch 342 energizes a relay switch CR3. The closing of contacts "a" of relay switch CR3 sets up a holding circuit through the stop switch 343. The relay switch CR3 is maintained energized during the automatic operation of the machine and is only deenergized in case it is desired to interrupt and stop the grinding cycle.

The closing of contact "b" of the relay switch CR3 energizes relay switches TR4 and CR2, these relays are held energized through the contacts "b" of the relay CR3 and contacts "a" of relay TR1, and contacts "a" of relay CR2. Relay switch CR2 is energized and contacts "b" of relay CR2 open to break a holding circuit to deenergize relay CR5.

When contacts of relay switch TR4 close after a predetermined time interval, current passes through the normally closed contacts "b" of relay switch CR7 to energize relay switch CR5. The closing of contacts "a" of relay switch CR5 serves to energize the solenoid S3a to shift the valve 280 toward the right so as to pass fluid under pressure to the right hand end of cylinder 270 to move the piston 271 and turret 201 toward the left to position a new work piece on the work collet 31. Valve 296 also moves toward the left. At this time a new work piece 32 rolls from a loading chute into an aperture in the turret 201. As piston 271 moves toward the left, the arm 315 imparts a corresponding movement toward the left to the valve stem 306. During movement of the valve 305 toward the left, after the turret 201 has completed its movement toward the left to place a work piece 32 on the collet 31, pressure is passed into the right hand end of the valve 320 to shift the valve members 321 and 323 toward the left so that released compression of the spring 39 causes a free exhausting of oil from the cylinder 40 to clamp the work piece 32 on the collet 31.

The shifting of valve 320 toward the left also releases compression of a spring to exhaust oil from pressure switch PS1 to close the contacts thereof. Closing PS1 energizes relay switch TR1. The normally closed contacts "a" of TR1 open to break the holding circuit to deenergize TR4 and CR2.

Deenergizing TR4 deenergizes CR5 which in turn deenergizes the solenoid S3a and the valve member 281 of the valve 280 moves to a central position. With the valve 280 in a central position fluid pressure is cut off from both ends of the cylinder 270. In this position of valve 280, fluid is free to by-pass from one end of the cylinder 270 to the other. The released compression of a spring 317 moves the piston 271 in cylinder 270 and the work turret 201 a slight distance toward the right to move the side plate 203 of the turret 201 a slight distance so that it is out of engagement with the work piece 32 to allow free rotation of the work piece 32 during a grinding.

Normally opened contacts "b" of relay switch TR1 close passing current through the normally closed timed delay contacts "c" of relay switch TR1, through normally closed contacts of relay switch CR6 and normally closed contacts "a" of relay switch CR14 to energize relay switch CR4. Normally open contacts "a" of relay switch CR4 close to energize the solenoid S1. The normally open contacts "b" of relay switch CR4 through the now closed normally open contacts "c" of relay switch CR3 sets up a holding circuit to hold relay switch CR4 and the solenoid S1 energized.

Energizing the solenoid S1 shifts the feed control valve 91 to the left so as to pass fluid under pressure to the right hand end of the feed cylinder 87 to cause a rapid approaching movement of the wheel slide 51 and the grinding wheels 55—56.

When valve 91 is shifted toward the left, fluid under pressure is passed to the left hand end of the feed control valve 102 to move the valve 102 toward the right. Movement of the valve 102 to the right allows fluid under pressure to pass through the by-pass valve 110 to the left hand end of the grinding feed cylinder 115 to move feed piston 116 toward the right so as to start a grinding feed, that is, rotation of the feed screw 65.

Pressure from valve 91 also enters the left hand end of the backlash valve 103 and shifts it toward the right. Fluid from the valve 91 also passes into the chamber 129 of the cylinder 125 to move the piston 126 toward the left so as to close the limit switch LS1 thereby energizing the relay switch CR1 to start the work drive motor 24.

During infeed rotation of the feed wheel 79 in a counter clockwise direction, as the work piece approaches a predetermined size, a cam 176 on the feed wheel 79 engages the cam 177 on the feed pawl 178 and rocks it in a counter clockwise direction to shift valve members 166 and 170 toward the right. The valve 166 moves ⅜″ toward the right and stops with a valve chamber 167 open to the fluid pressure pipe 83 so that fluid under pressure passes through a central passage 168 in the valve member 166 into the valve chamber 169 to continue movement of the valve member 170 into a right hand end position. In this position of the valve 170, fluid under pressure is passed to the right hand end of the cylinder 147 to move the piston 153 and work table 11 together with the work piece 32 a short distance toward the left. When the table reaches a left hand end position, a table dog 185 actuates the limit switch LS4. The closing of limit switch LS4 energizes CR6 to break the holding circuit to deenergize relay switch CR4 and solenoid S1. Deenergization of solenoid S1 shifts feed control valve 91 toward the right so as to cause the fluid under pressure to pass to the left hand end of the cylinder 87 to move the wheel slide 51 and grinding wheels 55—56 rapidly toward a rearward or inoperative position.

Shifting the feed control valve 91 serves to reverse fluid under pressure so as to reset valves 102, 103, 125, 166, and 170 and grinding wheel feed piston 116. Resetting valve opens LS1 to deenergize the relay switch CR1 so as to stop the work drive motor. When valves 166 and 170 are reset, the table 11 moves toward the right to a positive stop position.

During movement of the wheel slide 51 toward the rear or inoperative position, an adjustable dog 345 (Fig. 7) momentarily closes the limit switch LS5. Closing limit switch LS5 through normally closed contacts "b" of relay switch CR14 and contacts "b" of relay switch CR2 and now closed contacts "b" of relay switch CR5 energize relay switch CR7. Normally opened contacts "c" of relay switch CR7 close to energize solenoid S3b to shift the valve member 281 of the valve 280 toward the left so as to pass fluid under pressure to the left hand end chamber of the cylinder 270 to move the piston 271 and turret 201 toward the right.

When the piston 271 in cylinder 270 moves toward the right, valve 305 is also moved toward the right after lost motion has been taken up. Valve 305 in a right hand end position allows fluid to exhaust from the chamber 328 of the valve 320, due to the released compression of the spring 325, through pipe 327, through the valve 90 and out through an exhaust pipe 105.

Pressure from the feed control valve 91 passes through a chamber 322 in the valve 321 into the left hand end chamber of the cylinder 40 to unclamp the work collet 31. Pressure also opens the pressure actuated valve PS1 to deenergize the relay TR1. Pressure also passes from the valve 280 through the left hand end chamber 278 of the cylinder 270, through the valve 305 into the left hand end chamber of the valve 295 to shift the valve 295 toward the right at a rate controlled by the throttle valve 300.

During movement of the valve 295 to the right, fluid is passed through a left hand inner port, through a valve chamber 297 in the valve 295 into the left hand end of the reset cylinder 230 to cause an idle resetting stroke of the pawl and ratchet mechanism.

When the valve 295 reaches the right hand end position, fluid under pressure passes through a valve chamber 298 in the valve 295 into right hand end of the index cylinder 222 to cause a 90° indexing movement of the turret 201 to discharge a ground work piece 32 and to position the next work piece 32 to be ground in axial alignment with the work collet 31.

During the reset movement of the pawl and ratchet mechanism, limit switch LS3 closes and is held closed. The closing of limit switch LS3 energizes relay switch TR2. The normally closed contacts "a" open and the time delay relay contacts "b" closed. When the limit switch LS3 opens after an indexing movement of the turret 201 has been completed, the relay switch TR2 is deenergized. The normally closed contacts "a" of the relay switch TR2 close and the timed delay contacts "b" stay closed until a predetermined time interval elapses. During this time, a circuit is completed through the normally opened contacts "b" of the relay switch CR3, through a switch SW3 (which is closed for automatic recycling). Switch SW3 may be opened for manual operation if desired. Through the normally closed contacts "a" and timed delay contacts "b" of relay switch TR2 to energize relay switch TR4 and relay switch CR2 and deenergize relay switch CR7 to repeat the cycle as above described. After a short time interval, timed delay contacts "b" of relay switch TR2 open.

If the switch SW3 is opened, manual operation of the cycle control lever 340 is required to initiate each grinding cycle. If the switch SW3 is closed, the cycle automatically repeats to grind successive work pieces 32 and may be stopped only by manual actuation of the cycle control lever 340 in a clockwise direction to open the stop switch 343.

If it is desired to operate the machine on a manual cycle, the switch SW3 is opened. With the switch SW3 opened, the control lever 340 must be actuated to start each grinding cycle of the machine.

It will thus be seen that there has been provided by this invention apparatus in which the various objects herein above set forth together with many throughly practical advances are successfully achieved. As many possible embodiments may be made of the above invention and as many changes might be made in the embodiment above set forth, it would be understood that all matter hereinbefore set forth, or shown in the accompanying drawings, is to be interpreted as illustrative and not in a limiting sense.

I claim:

1. In a grinding machine having a base, a transversely movable rotatable grinding wheel, a rotatable work support including an expansible work collet, means to impart a relative transverse feeding movement between said grinding wheel and work collet and a work loading and discharge mechanism including a work chute and a rotatable indexable turret having a plurality of work apertures, an index mechanism for said turret to convey successive work pieces from said chute into axial alignment with said collet, means to move said turret axially successively to position work pieces onto said collet for a grinding operation and to remove successive work pieces from said collet after a grinding operation, and a work discharge chute to receive a ground work piece from said turret after each indexing movement of said turret.

2. In a grinding machine, as claimed in claim 1, in combination with the parts and features therein specified of an escapement mechanism to normally hold a plurality of work pieces in said work chute, and means actuated in timed relation with the axial movement of the turret to actuate said escapement mechanism when the turret is moved to position a work piece on said collet to facilitate movement of a new work piece into said turret.

3. In a grinding machine having a base, a transversely movable rotatable grinding wheel thereon, a rotatable work support on said base including a work supporting chuck, means to impart a relative transverse feeding movement to said grinding wheel and work chuck, and a work loading and discharging mechanism including a work chute to support a plurality of work pieces to be ground, a rotatable indexable work turret having a plurality of work apertures to receive successive work pieces from said chute, an index mechanism for said turret to position successive work pieces into axial alignment with said chuck, means to move said turret axially successively to position work pieces on said chuck for a grinding operation, said turret serving after a grinding operation to remove work pieces from said chuck, and a work discharge chute to receive a ground work piece from said turret after each indexing movement thereof.

4. In a grinding machine, as claimed in claim 2, in combination with the parts and features therein specified and wherein said means to actuate said escapement mechanism includes a cam on said turret.

5. In a grinding machine, as claimed in claim 3, in combination with the parts and features therein specified of a longitudinally movable table on said base to support said work support and turret, means including a piston and cylinder operatively connected to move said table longitudinally a control valve therefor, and means actuated by and in timed relation with said feeding mechanism to actuate said valve so as to cause a predetermined longitudinal movement to said table.

6. In a grinding machine, as claimed in claim 3, in combination with the parts and features therein specified of side plates on opposite side faces of said turret, one of said side plates serving to position successive work pieces on said chuck before a grinding operation, the other of said side plates serving to remove a ground work piece from said chuck.

7. In a grinding machine, as claimed in claim 3, in combination with the parts and features therein specified of work feeding mechanism including a nut and screw mechanism to feed said grinding wheel transversely in either direction, a piston and cylinder mechanism operatively connected to move said feed screw axially to cause a rapid approaching movement of said grinding wheel, means including a piston and cylinder to rotatable said screw to impart a grinding feed to said grinding wheel, means including a solenoid-actuated feed control valve to control the admission to and exhaust of fluid from both of said cylinders, means to energize said solenoid to initiate a grinding cycle, and including a limit switch actuated by and in timed relation with the longitudinal movement of said table to deenergize said solenoid to cause a resetting of both of said pistons after a predetermined grinding operation.

8. In a grinding machine, as claimed in claim 3, in combination with the parts and features therein specified of means including a feed control valve to control the feeding means, yieldable means to actuate said chuck to hold a work piece thereon during a grinding operation, a work chuck actuating piston and cylinder operatively connected to release said chuck and operative connections between said feed control valve and said chuck cylinder so that the work chuck is actuated by and in timed relation with the feeding means.

9. In a grinding machine, as claimed in claim 3, in combination with the parts and features therein specified in which the index mechanism for the turret includes a pawl and ratchet mechanism to index said work turret, a piston and cylinder to actuate said pawl and ratchet, a control valve to control the admission to and exhaust of fluid from said cylinder, a piston and cylinder operatively connected to move said turret axially in either direction to position a work piece in said chuck before a grinding operation and to remove it therefrom after a grinding operation, a solenoid-actuated control valve to control the admission to and exhaust of fluid from said latter cylinder, and operative connections between said latter cylinder and said index control valve arranged to impart an indexing movement to said turret.

10. In a grinding machine, as claimed in claim 2, in combination with the parts and features therein specified of a side plate on each side of said turret, one of said side plates serving to push a work piece on said work collet before grinding and the other serving to remove a ground work piece therefrom after grinding, a piston and cylinder operatively connected to move said turret axially, an adjustable stop to limit the movement of said piston in one direction to determine the loading position of said turret, and yieldable connection between said piston and said stop to impart a slight axial movement to said turret after a work piece is secured on said collet so that the work piece pushing side plate is out of engagement with the work piece during a grinding operation.

11. In a grinding machine, as claimed in claim 2, in combination with the parts and features therein specified of a spring to actuate said collet to clamp a work piece thereon during a grinding operation, means including a piston and cylinder to unclamp said collet, a piston and cylinder operatively connected to move said turret axially to position successive work pieces on said collet before grinding and to remove work pieces therefrom after grinding, and means including a control valve actuated by and in timed relation with the movement of said latter piston when a work piece is positioned on said collet to exhaust fluid from said first cylinder so as to release the compression of said spring to clamp the work piece on the collet.

12. In a grinding machine having a base, a transversely movable rotatable grinding wheel thereon, a rotatable work support on said base including a work supporting chuck, means to impart a relative transverse feeding movement to said grinding wheel and work chuck, and a work loading and discharge mechanism including work chute to support a plurality of work pieces to be ground, a rotatable indexable work turret having a plurality of work apertures to receive successive work pieces from said chute, and index mechanism for said turret to position successive work pieces into axial alignment with said chuck, means including a piston and cylinder to actuate said index mechanism, a control valve therefor, means including a piston and cylinder to move said turret axially successive to position work pieces on said chuck for a grinding operation and to remove work pieces therefrom after a grinding operation, and fluid connections between said latter cylinder and said index control valve to prevent indexing movement for said work turret except when the work turret is in an inoperative position.

13. In a grinding machine, as claimed in claim 12, in combination with the parts and features therein specified of an interlock valve interposed between turret actuating cylinder and the index control valve, and operative connections between the interlock valve and the turret position piston to arrange to actuate the interlock valve by and in timed relation with axial movement of the work turret.

References Cited in the file of this patent
UNITED STATES PATENTS

| | | |
|---|---|---|
| 1,779,823 | Norton | Oct. 28, 1930 |
| 2,117,917 | Silven | May 17, 1938 |
| 2,648,175 | Fraser | Aug. 11, 1953 |